(12) United States Patent
Glovatsky et al.

(10) Patent No.: US 7,329,033 B2
(45) Date of Patent: Feb. 12, 2008

(54) CONVECTIVELY COOLED HEADLAMP ASSEMBLY

(75) Inventors: Andrew Zachary Glovatsky, Plymouth, MI (US); Myron Lemecha, Dearborn, MI (US); Prathap Amervai Reddy, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 34 days.

(21) Appl. No.: 11/257,730

(22) Filed: Oct. 25, 2005

(65) Prior Publication Data

US 2007/0091632 A1   Apr. 26, 2007

(51) Int. Cl.
*B60Q 1/00* (2006.01)
(52) U.S. Cl. ............... 362/547; 362/294; 362/373; 362/545
(58) Field of Classification Search .......... 362/294, 362/547, 480, 507, 544, 546, 158, 800, 264, 362/373, 96, 218
See application file for complete search history.

(56) References Cited

U.S. PATENT DOCUMENTS

| | | | |
|---|---|---|---|
| 1,681,153 A | 8/1928 | Johnston | |
| 3,309,565 A | 3/1967 | Clark et al. | |
| 3,539,799 A | 11/1970 | Dangauthier | |
| 3,639,751 A | 2/1972 | Pichel | |
| 4,085,248 A | 4/1978 | Zehender et al. | |
| 4,168,522 A | 9/1979 | Van de Laarschot et al. | |
| 4,598,347 A * | 7/1986 | Peppers | 362/373 |
| 4,724,515 A | 2/1988 | Matsuki et al. | |
| 4,729,076 A | 3/1988 | Massami et al. | |
| 4,780,799 A | 10/1988 | Groh | |
| 4,931,912 A | 6/1990 | Kawakami et al. | |
| 4,937,710 A | 6/1990 | Hurley et al. | |
| 4,978,890 A | 12/1990 | Sekiguchi et al. | |
| 5,172,973 A | 12/1992 | Spada | |
| 5,174,646 A * | 12/1992 | Siminovitch et al. | 362/218 |
| 5,406,467 A | 4/1995 | Hashemi | |
| 5,458,505 A * | 10/1995 | Prager | 439/485 |
| 5,758,955 A | 6/1998 | Belliveau | |
| 5,857,767 A | 1/1999 | Hochstein | |

(Continued)

FOREIGN PATENT DOCUMENTS

FR   2 701 756   2/1993

(Continued)

OTHER PUBLICATIONS

English Abstract of French Publication No. FR 2 698 055 A1, no date.

(Continued)

*Primary Examiner*—Jong-Suk (James) Lee
*Assistant Examiner*—Kevin Spinella
(74) *Attorney, Agent, or Firm*—Brinks Hofer Gilson & Lione

(57) ABSTRACT

A headlamp assembly for a motor vehicle including a lens and a housing that cooperate to define an inner chamber that is generally isolated from the atmosphere. A heat sink includes a fin portion that extends from the inner chamber so as to be exposed to ambient air. A light source is located within the inner chamber and is supported on a base portion of the heat sink. The heat sink conducts heat from the light source to air located exterior of the chamber.

11 Claims, 7 Drawing Sheets

U.S. PATENT DOCUMENTS

| | | | |
|---|---|---|---|
| 5,947,592 A | 9/1999 | Barlow | |
| 6,021,954 A | 2/2000 | Kalwa et al. | |
| 6,045,248 A | 4/2000 | Ashizawa | |
| 6,071,000 A * | 6/2000 | Rapp | 362/547 |
| 6,183,114 B1 | 2/2001 | Cook et al. | |
| 6,210,024 B1 | 4/2001 | Shida | |
| 6,224,247 B1 | 5/2001 | Ashizawa | |
| 6,367,949 B1 * | 4/2002 | Pederson | 362/240 |
| 6,402,346 B1 | 6/2002 | Liano et al. | |
| 6,419,382 B1 | 7/2002 | Nakagawa et al. | |
| 6,497,507 B1 | 12/2002 | Weber | |
| 6,558,026 B2 | 5/2003 | Strazzanti | |
| 6,595,672 B2 * | 7/2003 | Yamaguchi | 362/547 |
| 6,634,771 B2 | 10/2003 | Cao | |
| 6,644,842 B2 * | 11/2003 | Yamaguchi | 362/547 |
| 6,648,495 B1 | 11/2003 | Hsu | |
| 6,676,283 B2 | 1/2004 | Ozawa et al. | |
| 6,682,211 B2 | 1/2004 | English et al. | |
| 6,773,154 B2 | 8/2004 | Desai | |
| 6,860,620 B2 | 3/2005 | Kuan et al. | |
| 6,864,513 B2 | 3/2005 | Lin et al. | |
| 6,910,794 B2 | 6/2005 | Rice | |
| 2002/0141188 A1 | 10/2002 | Basey | |
| 2002/0154514 A1 | 10/2002 | Yagi et al. | |
| 2002/0167818 A1 * | 11/2002 | Yoneima | 362/547 |
| 2003/0002179 A1 | 1/2003 | Roberts et al. | |
| 2003/0218885 A1 | 11/2003 | Ishizaki | |
| 2004/0012975 A1 | 1/2004 | Chase et al. | |
| 2004/0085768 A1 | 5/2004 | Kai et al. | |
| 2004/0120156 A1 | 6/2004 | Ryan | |
| 2004/0145909 A1 | 7/2004 | Ognian et al. | |
| 2004/0149054 A1 | 8/2004 | Soga et al. | |
| 2004/0202007 A1 | 10/2004 | Yagl et al. | |
| 2004/0213016 A1 | 10/2004 | Rice | |
| 2005/0024864 A1 | 2/2005 | Galli | |
| 2005/0094414 A1 | 5/2005 | Ishida et al. | |

FOREIGN PATENT DOCUMENTS

| | | |
|---|---|---|
| FR | 2 698 055 A | 5/1994 |
| FR | 2698055 A1 * | 5/1994 |
| JP | 5 235224 | 9/1993 |

OTHER PUBLICATIONS

English Abstract of Japanese Publication No. JP 5 235224, no date.
English Abstract of French Publication No. FR 2 701 756, no date.

* cited by examiner

CONVECTIVELY COOLED HEADLAMP ASSEMBLY

BACKGROUND

1. Field of the Invention

The invention relates generally to a headlamp assembly for a motor vehicle. More specifically, the invention relates to the cooling of a headlamp assembly by conducting heat from the light source to the exterior of the headlamp assembly via conductive heat sinks.

2. Related Technology

Headlamp assemblies have a light source, such as an incandescent lamp, a light emitting diode (LED) or high intensity discharge (HID) lamp, positioned within a headlamp chamber and electrically connected to a power source. The headlamp chamber is typically defined by a transparent or translucent lens, located forward of the light source, a reflector and/or housing located rearward and/or surrounding the light source. As used herein, the terms forward and rearward are referenced with respect to the position of the light source and the location of the area which the light from the source is intended to illuminate. Thus, light from the assembly is intended to illuminate an area in a forward position.

During an operation cycle of the headlamp assembly, the light sources and other components of the lamp generate heat while "on" and cool while "off", causing the chamber to undergoes temperature fluctuation and causing the air located within to expand and contract. To maintain a relative-constant chamber pressure, the chamber typically includes at least one opening that permits an air exchange between the chamber and the ambient air. However, to prevent contaminants, such as dust and debris, from entering the chamber, the opening is typically relatively small and is covered with an air-permeable membrane.

In order to attain designed optimal performance of newer light sources, such as light emitting diodes (LED'S), and their electrical components in the lamp assembly, it is desirable to maintain the internal temperature of the lamp assembly below the maximum operating temperature. Therefore it is advantageous to provide the headlamp assembly with a mechanism that cools the chamber and the LED'S located therein.

Headlamp assemblies are typically secured to a portion of the vehicle frame that is adjacent to the engine compartment. The temperature within the engine compartment is often significantly higher than the temperature outside of the engine compartment (the ambient temperature). For example, during operation of the vehicle's various components, such as the engine and the engine cooling system, these components output heated air into the engine compartment. As another example, during periods of vehicle use and non-use, the air trapped within the engine compartment may become heated by solar energy. Therefore, it is advantageous to provide the headlamp assembly with a mechanism that isolates the chamber and the light sources located therein from the relatively high temperatures of the engine compartment.

In view of the above, it is beneficial to have a headlamp assembly that has a mechanism that effectively cools the mechanism's internal components while minimizing air exchange between the headlamp assembly chamber and the atmosphere and while isolating the chamber from the engine compartment and the relatively high temperatures associated therewith.

SUMMARY

In overcoming the above limitations and other drawbacks, a headlamp assembly for a motor vehicle is provided that includes a lens and a housing that cooperate to define an inner chamber that is generally fluidly isolated from the atmosphere. A heat sink includes a base portion that is positioned within the inner chamber and a fin portion that extends to a position where it is exposed to ambient air. Supported on the base portion of the heat sink within the chamber is a light source. A reflector is positioned behind the light source and reflects light forward from the light source.

In one aspect, the headlamp assembly includes a flow channel positioned adjacent the housing. The flow channel is adapted to direct ambient air flowing therethrough. The fin portion of the heat sink extends into the flow channel such that heat from within the inner chamber is conducted through the heat sink to the air flowing through the flow channel.

In another aspect, air flow through the flow channel can be achieved by natural convention, forced convection, induced forced convection, or any combination thereof.

In still another aspect, the flow channel is positioned behind the housing and the fin portion of the heat sink extends rearward, through the housing into the flow channel.

In yet another aspect, a plurality of flow channels are spaced circumferentially around and positioned radially outward of the inner chamber. One heat sink is mounted within the inner chamber, positioned radially inward and adjacent each flow channel. A light source is mounted onto the base portion of each heat sink, and the fin portion of each heat sink extends radially outward, through the housing, into the adjacent flow channels. The light sources may be LEDs, and/or an alternate or additional light source, such as a high intensity discharge light (HID) may be positioned within the inner chamber, generally centered with respect to the light emitting diodes.

In still another aspect, the fin portion of the heat sink extends forward through the lens, such that heat from within the inner chamber is conducted through the heat sink to the air flowing across the lens. A plurality of light sources may be mounted onto the base portion of a common heat sink.

Further objects, features and advantages of this invention will become readily apparent to persons skilled in the art after a review of the following description, with reference to the drawings and claims that are appended to and form a part of this specification.

DETAILED DESCRIPTION

Figure 1:
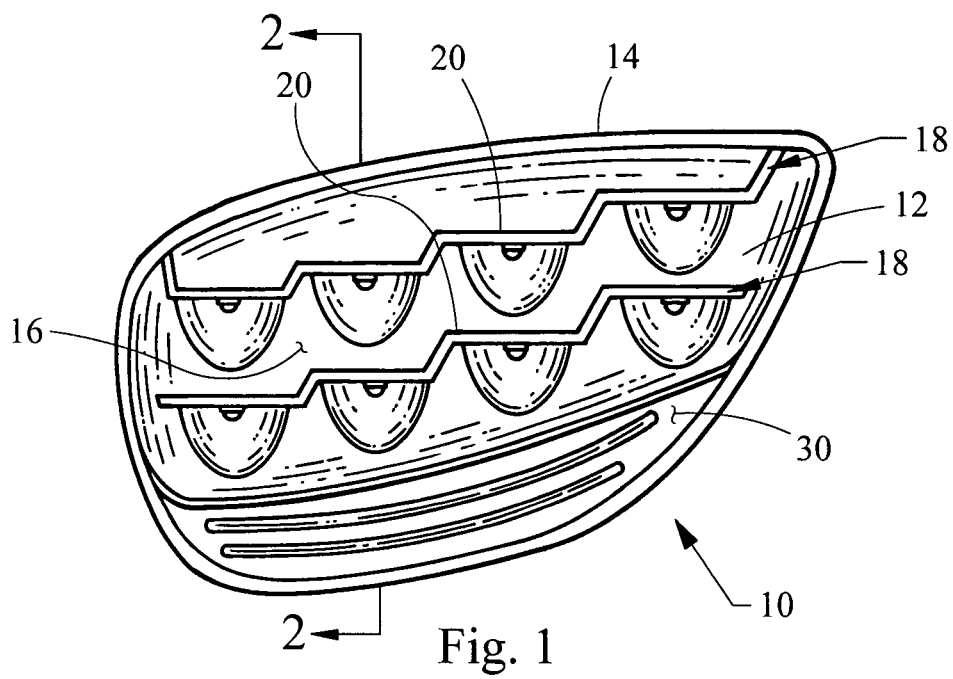
FIG. 1 is a front view of a headlamp assembly for a motor vehicle having features described in the claims.

Referring to FIGS. 1 and 2, a headlamp assembly for a motor vehicle in accordance with the teachings of the claims herein is shown generally at 10. The headlamp assembly 10 includes a lens 12 and a housing 14 that cooperate to at least partially define an inner chamber 16, which is generally fluidly isolated from the atmosphere. The housing 14 is preferably opaque, and the lens 12 is preferably formed from a transparent or translucent plastic material, such as polycarbonate.

The headlamp assembly 10 also includes a heat sink 18 mounted therein. The heat sink 18 includes a base portion 20 positioned within the inner chamber 16, and a fin portion 22, the latter extending outside the inner chamber 16 and being exposed to ambient air. As shown in FIGS. 1 and 2, the headlamp assembly 10 may include a plurality of heat sinks 18. As seen therein, a first group of heat sinks 18 are staggered in an upper row, and a second group of heat sinks 18 are staggered in a lower row.

The base portion 20 of each heat sink 18 is positioned within the interior of the inner chamber 16, and the fin portion 22 of each heat sink 18 extends rearward, through the rear wall 14a of the housing 14, such that the fin portions 22 are exposed outside the inner chamber 16.

The headlamp assembly 10 includes surfaces that cooperate to focus light rays from light sources 24 into a beam having desired characteristics and direct the light rays towards the lens 12. As shown, a reflector 26 is positioned within the inner chamber 16 and is positioned relative to each light source 24. The reflectors 26 re-direct the light rays that hit the reflectors 26 in the forward direction, through the lens 12.

A plurality of light sources 24 are also positioned within the inner chamber 16. The housing 14 and the lens 12 are connected with one another such that the inner chamber 16 is substantially sealed from the atmosphere. The inner chamber 16 is, however, provided with pressure vents (not shown) that permit a relatively small amount of airflow into and out of the inner chamber 16 to account for air pressure fluctuations during temperature changes therein.

As mentioned above, the light sources 24 are preferably light emitting diodes (LEDs). Each light source 24, hereinafter just "LED 24", is attached to a printed circuit board (PCB) 28 that includes electronic controls and connections for the LED 24. Furthermore, each LED 24 and the PCB 28 are supported on the base portion 20 of one of the heat sinks 18, such that the fin portion 22 of the heat sinks 18 conduct heat away from the LEDs 24, as will be further discussed below. The heat sinks 18 are constructed of a material having a relatively high thermal conductivity, such as metals, metal alloys, silicon, and graphite.

During operation of the headlamp assembly 10, each LED 24 generates heat that tends to increase the temperature of the air, components and structures located within the inner chamber 16. However, the LED 24 and/or other electronic components may experience diminished performance or failure if their maximum operating temperatures are exceeded. To reduce the temperature of these components, the light sources 24 are mounted onto the base portion 20 of the heat sinks 18 such that heat from the light sources 24 will be conducted through the base portion 20 to the fin portion 22 of the heat sinks 18. Ambient air outside the inner chamber 16 will flow across the fin portion 24 of the heat sinks 18 and will cool the fin portion 22, thereby dissipating the heat conducted from within the inner chamber 16.

To insure that ambient air is directed across or over the fin portion 22 of the heat sink 18, the headlight assembly 10 includes a flow channel 30 positioned adjacent the housing 14. As shown in FIG. 2, a flow channel wall 32 is positioned adjacent to and spaced from the rear wall 14a of the housing 14, thereby defining the flow channel 32. The flow channel wall 32 and the rear wall 14a of the housing 14 are preferably spaced apart from each other along their respective lengths so that the flow channel 30 has a substantially constant width, thereby minimizing flow loss across the flow channel 30.

The flow channel 30 is adapted to direct ambient air flowing therethrough, wherein the fin portion 22 of the heat sinks 18 extend into the flow channel 30, such that heat from within the inner chamber 16 is conducted through the heat sinks 18 to the air flowing through the flow channel 30.

Figure 2A:
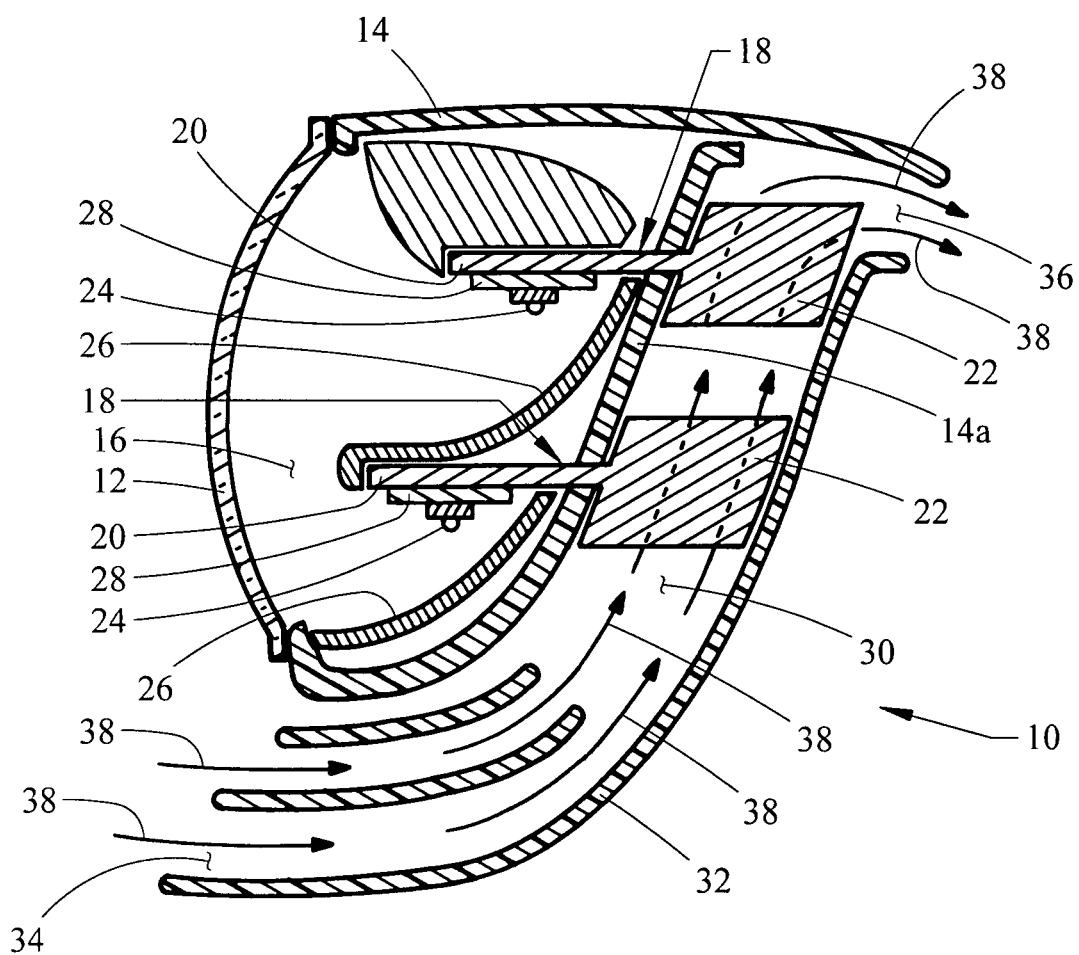
FIG. 2A is a sectional view taken along line 2-2 of the headlamp assembly shown in FIG. 1, wherein heat sink fins extend from the inner chamber to a flow channel adjacent the housing, and the inlets of the flow channel face forward.

Referring to FIG. 2A, the flow channel 30 includes an inlet 34 and an outlet 36. The inlet 34 of the flow channel 30 is oriented in the forward direction and is positioned near the front bottom of the headlamp assembly 10. The outlet 36 of the flow channel 30 is oriented in the rearward direction and is positioned near the rear top of the headlamp assembly 10. By placing the headlamp assembly 10 near a front portion of the motor vehicle, the headlamp assembly 10 is positioned such that when the motor vehicle is moving in a forward direction, a stream of ambient air is caused to flow into the inlet 34 and through the flow channel 30, and out the outlet 36, as shown by arrows 38. Flow achieved in this manner is referred to herein as forced convective flow.

An air duct or opening defined by the front portion of the vehicle body, such as the bumper, may be positioned near the inlet 34 to further promote the inflow of cool air. Alternatively, the air duct or opening may be positioned along the underside of the motor vehicle so as to capture naturally-flowing air during movement of the motor vehicle. To the extent possible, the inlet 34 is preferably positioned away from any heat source. For example, the inlet 34 is preferably located in a relatively forward location of the headlamp assembly 10, such as in a location adjacent to the lens 12 of the assembly 10. This location reduces the likelihood that the inlet 34 will capture heated air from the relatively hot components of the engine compartment before entering the flow channel 30.

Figure 2B:
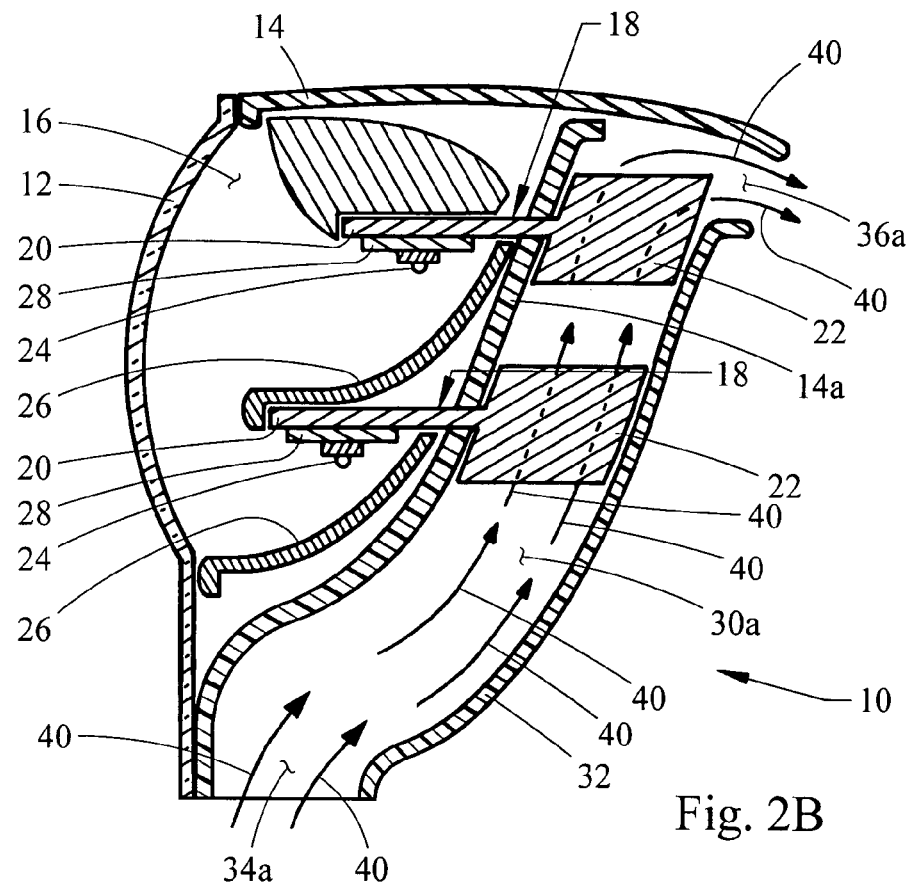
FIG. 2B is a sectional view similar to FIG. 2A, wherein the inlet of the flow channel faces downward.

Referring to FIG. 2B, alternatively, the inlet 34a is located near the front bottom of the headlamp assembly 10, but is not exposed openly to the front of the vehicle. The outlet 36a is again positioned near the rear top of the headlamp assembly 10. In this instance, as the fin portion 22 of the heat sinks 18 heat up, the air within the flow channel 30a will be convectively heated. Even when the vehicle is not moving, the heated air will rise upward, causing a draft that will pull cooler air up from the inlet 34a. As cooler air comes upward into contact with the fin portion 22, the cooler air will in turn be heated and rise upward, thereby creating a flow of air through the flow channel 30a by a natural convective flow, as indicated by arrows 40.

Figure 2C:
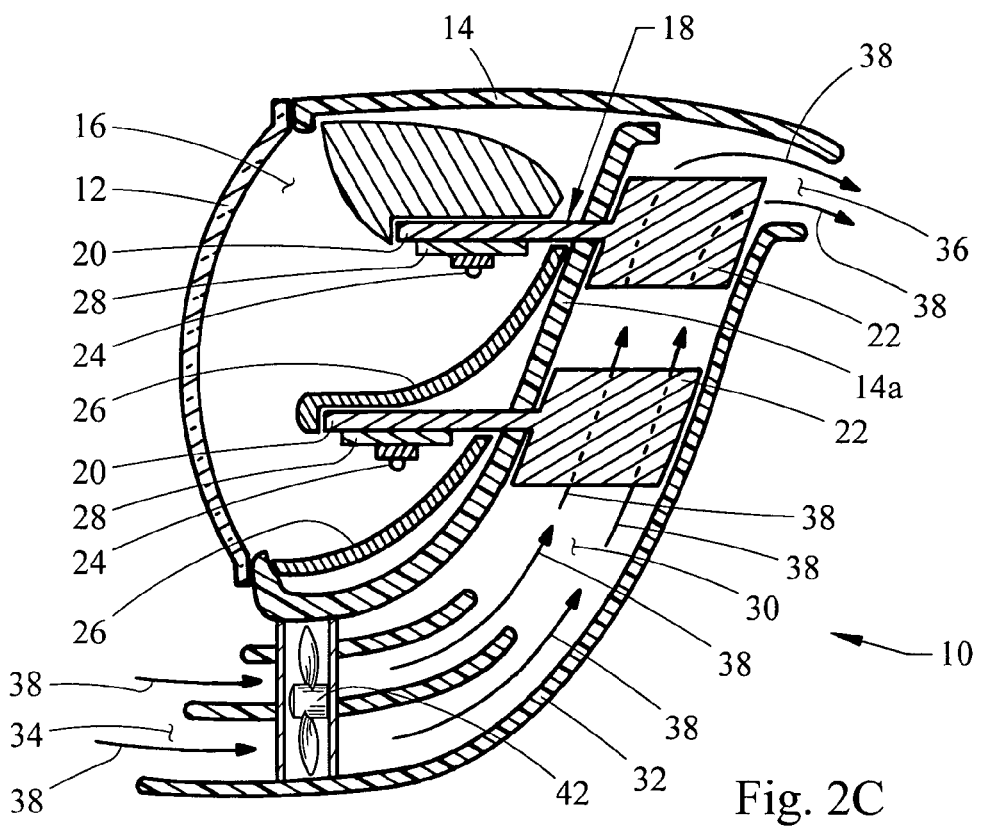
FIGS. 2C and 2D are sectional views similar to FIGS. 2A and 2B, wherein the inlet of the flow channels include a fan to draw air inward.
Figure 2D:
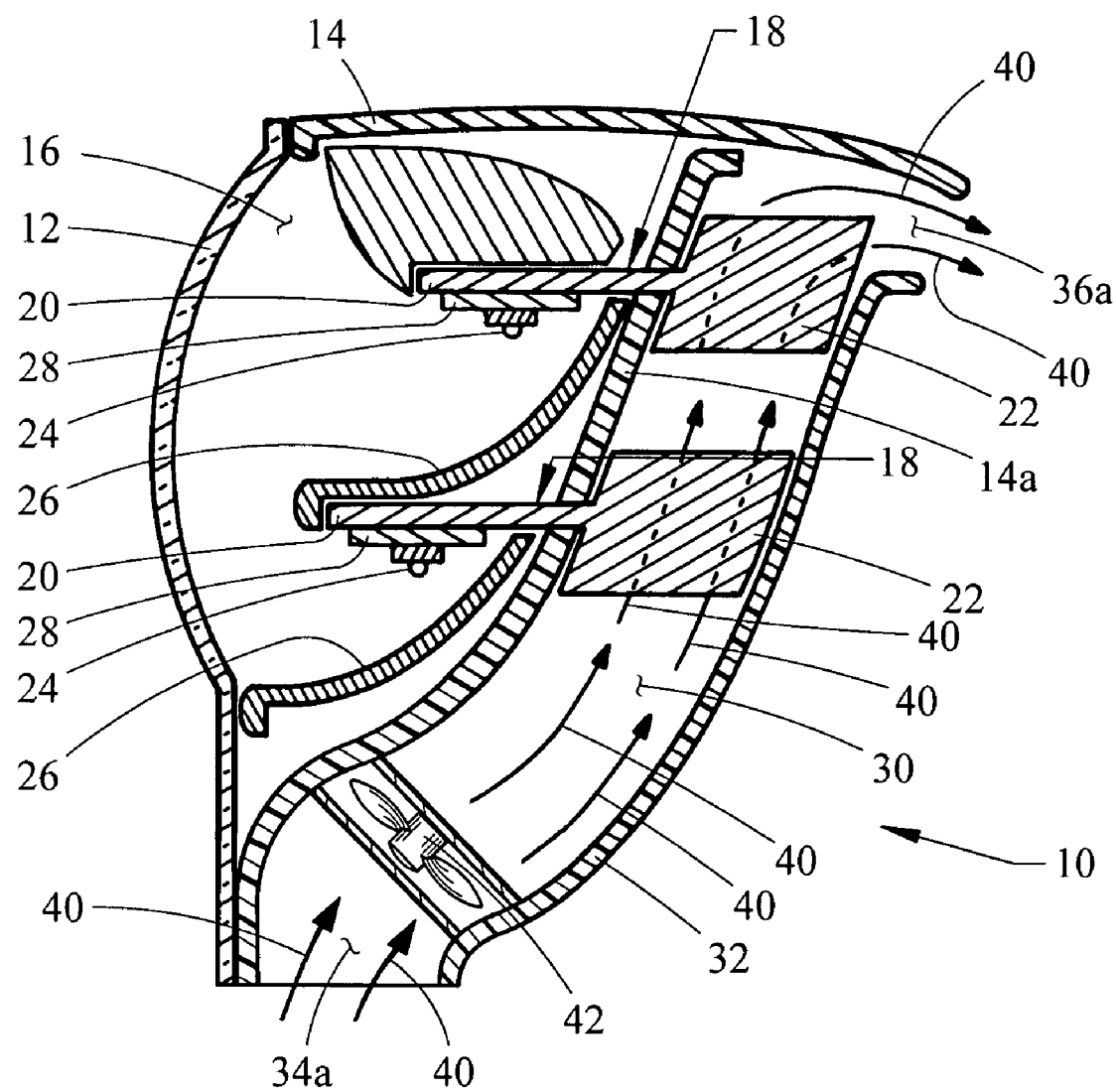

Referring to FIGS. 2C and 2D, either of the embodiments shown in FIGS. 2A and 2B could also include a fan 42 mounted near the inlets 34, 34a of the flow channels 30, 30a, respectively. An electric fan 42 would also provide a forced convective flow of air in through the inlets 34, 34a, through the flow channels 30, 30a, and out the outlets 36, 36a.

Figure 3:
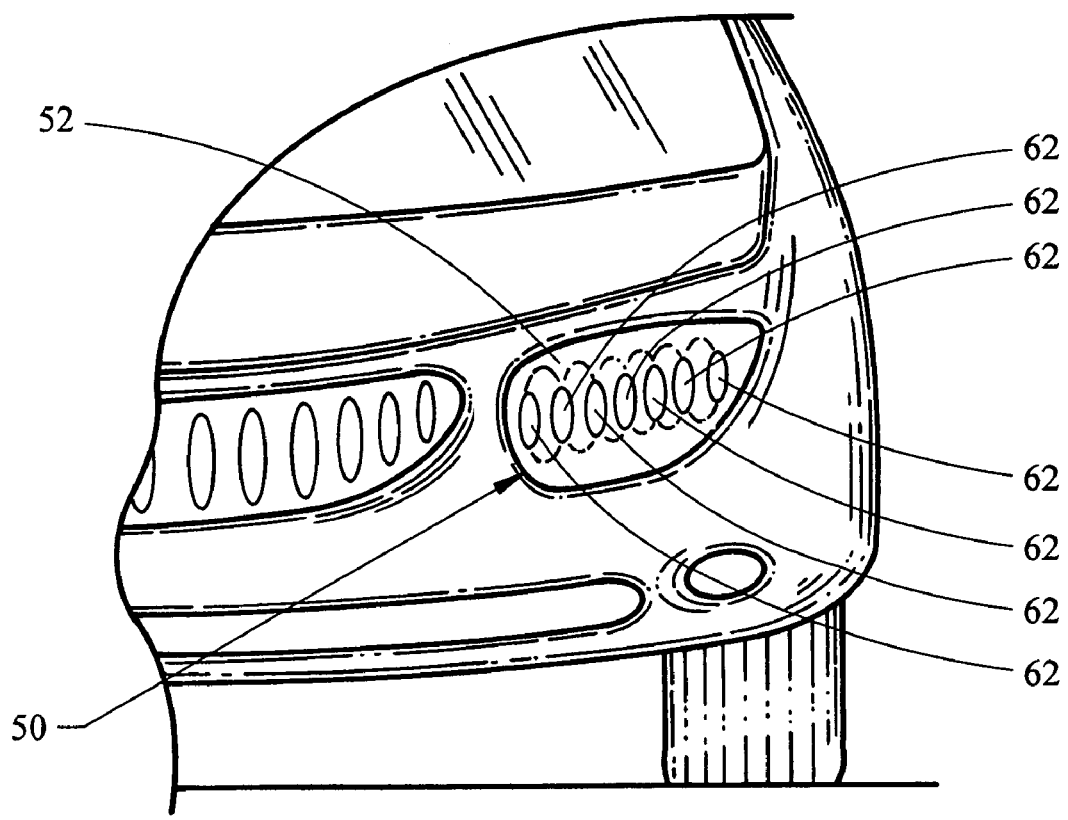
FIG. 3 is a partial front view of a motor vehicle having a headlamp assembly wherein the heat sink fins extend forward through the lens of the headlamp assembly.
Figure 4:
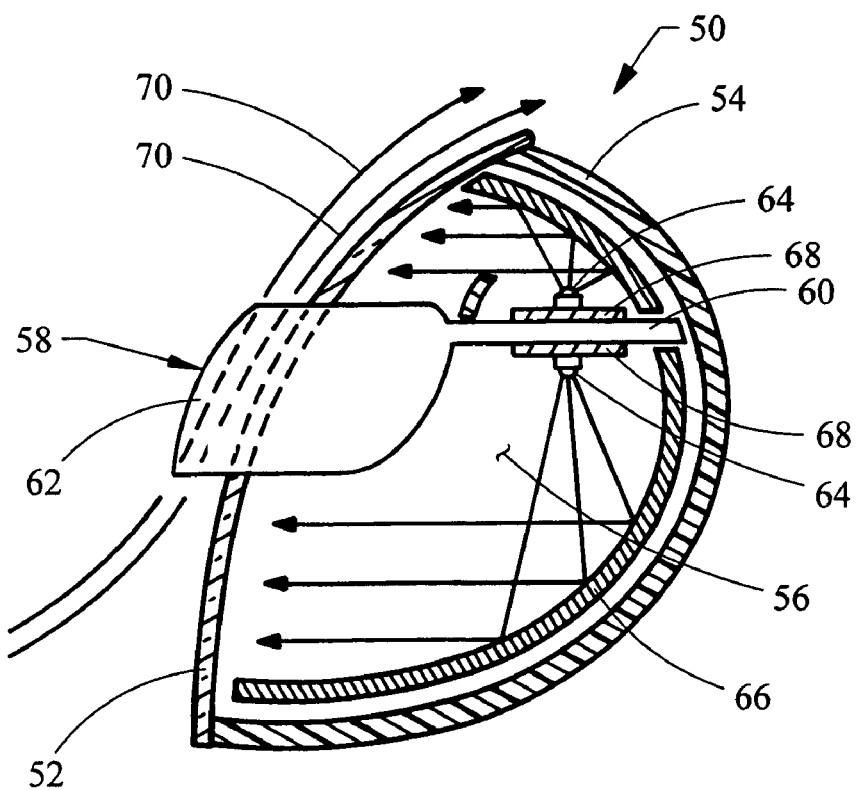
FIG. 4 is a cross-section taken generally along line 4-4 of FIG. 3.

Another embodiment of the headlamp assembly is shown generally at 50 in FIGS. 3 and 4. The headlamp assembly 50 includes a lens 52 and a housing 54 that cooperate to at least partially define an inner chamber 56 that is generally fluidly isolated from the atmosphere. The housing 54 is preferably opaque, and the lens 52 is preferably formed from a transparent or translucent plastic material, such as polycarbonate.

The headlamp assembly 50 includes a heat sink 58 mounted therein. The heat sink 58 includes a base portion 60 positioned within the inner chamber 56, and a fin portion 62 extending outside the inner chamber 56 and being exposed to ambient air. As shown in FIG. 4, The headlamp assembly 50 includes a plurality of heat sinks 58 so mounted therein. The base portion 60 of each heat sink 58 is positioned within the interior of the inner chamber 56, and the fin portion 62 of each heat sink 58 extends forward, through the lens 52, such that the fin portions 62 extend outside the inner chamber 56.

A with the previous embodiments, the headlamp assembly 50 includes surfaces that focus the light rays from a light source 64 into a beam having desired characteristics and directed toward the lens 52. As shown, these surfaces are part of a reflector 66 positioned relative to each light source 64, within the inner chamber 56. The reflectors 66 re-direct the light rays that hit the reflectors 66 to the forward direction, through the lens 52.

The housing 54 and the lens 52 are connected with one another such that the inner chamber 56 is substantially sealed from the atmosphere. The inner chamber 56 is, however, provided with pressure vents (not shown) that permit a relatively small amount of airflow into and out of the inner chamber 56 to account for air pressure fluctuations during temperature changes therein.

A plurality of light sources 64 are also positioned within the inner chamber 56. The light sources 64, are again preferably LEDs attached to PCB 68 that includes electronic controls and connections for the LED 64. Furthermore, each LED 64 and the PCB 68 are supported on the base portion 60 of the heat sink 58. As shown, one LED 64 is mounted to the top surface and one LED is mounted to the bottom surface of the base portion 60 of each heat sink 58. The fin portion 62 of the heat sinks 58 conduct heat away from the LEDs 64. The heat sinks 58 are constructed of a conductive material as previously discussed.

During operation of the headlamp assembly 50, heat generated by the LED 64 will be conducted through the base portion 60 of the heat sinks 58 to the fin portion 62 located outside the inner chamber 56. As the vehicle moves forward, ambient air is caused to flow across the front of the headlamp assembly 50 and across the fin portion 62 of the heat sinks 58, as indicated by arrows 70, and cool the fin portion 62 of the heat sinks 58, thereby dissipating the heat conducted from within the inner chamber 56.

Figure 5:
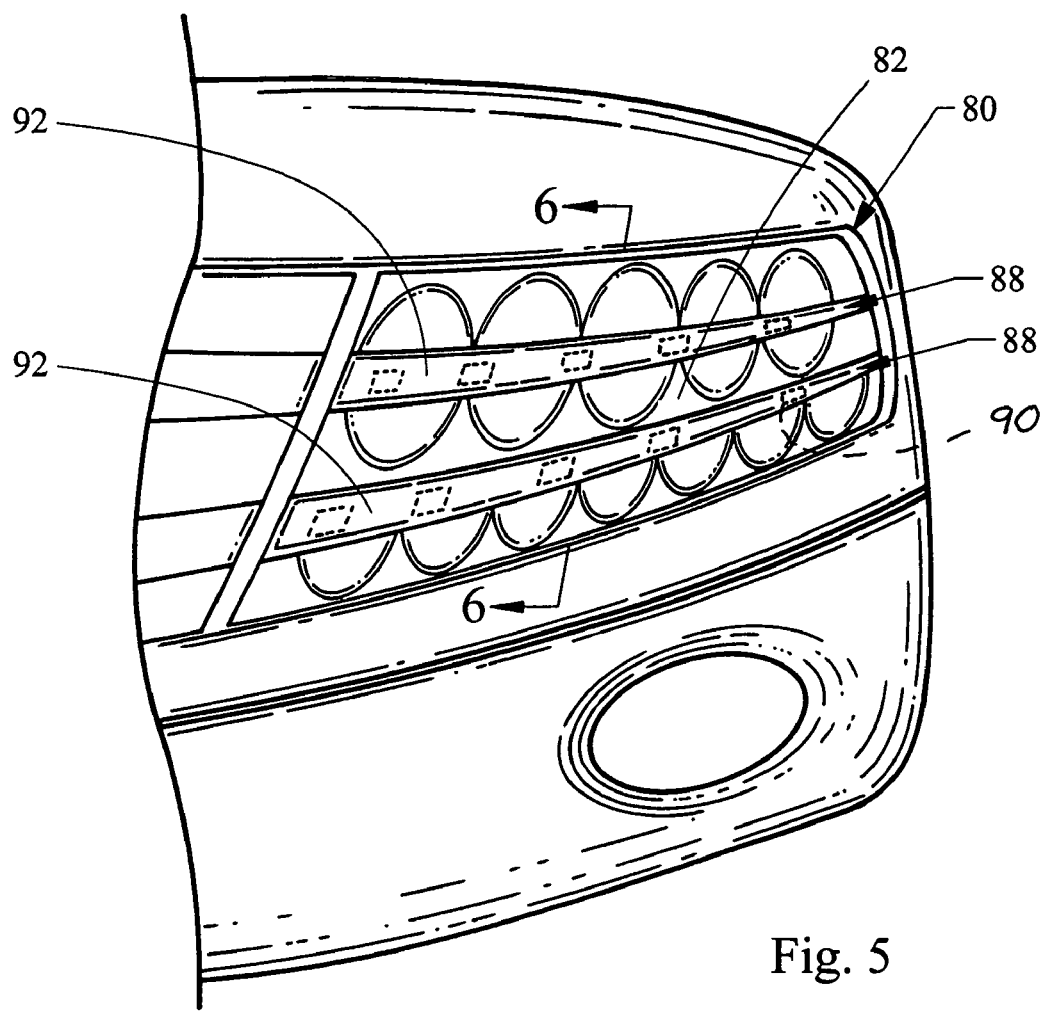
FIG. 5 is a front view of a headlamp assembly having a plurality of light sources mounted onto the base portion of a common heat sink.
Figure 6:
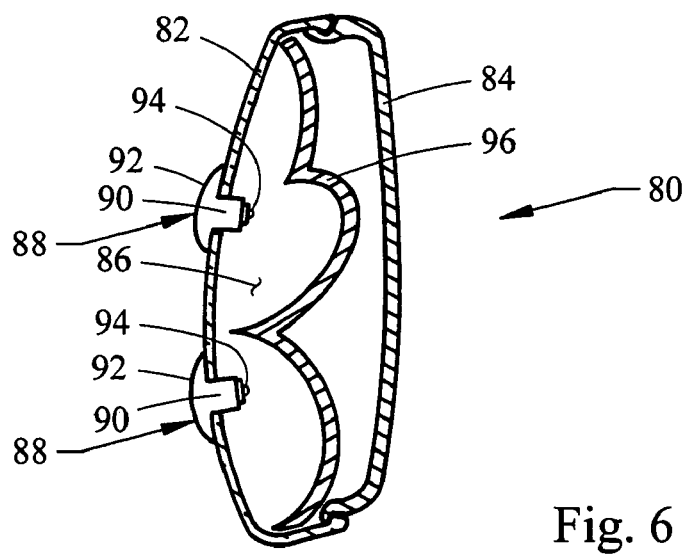
FIG. 6 is a side sectional view taken generally along lines 6-6 of FIG. 5.
Figure 7:
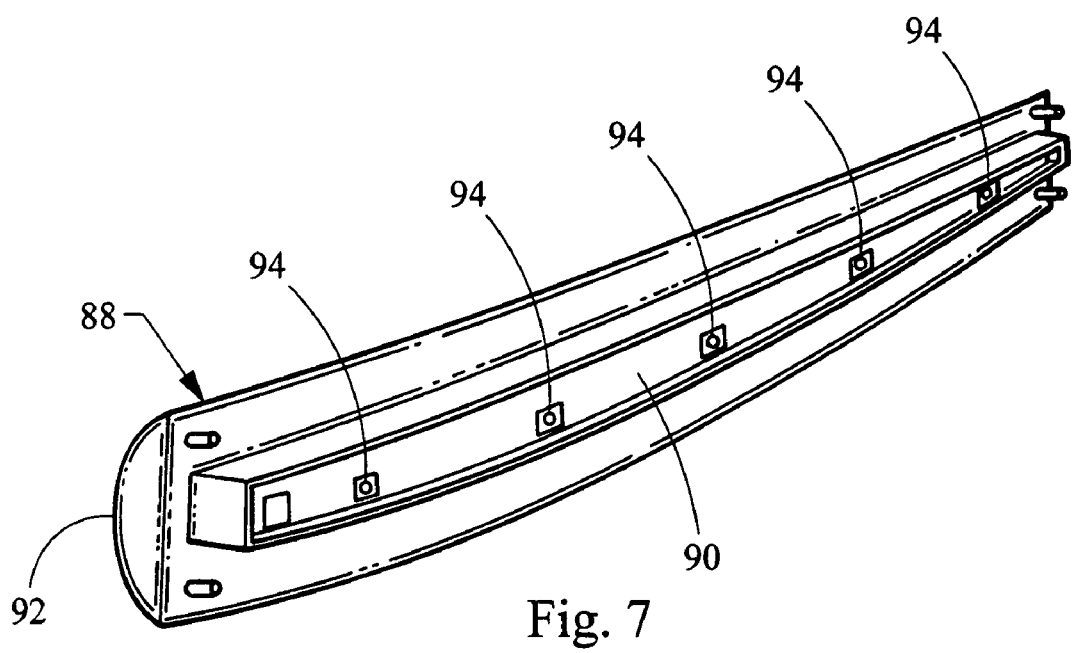
FIG. 7 is a rear perspective view of the heat sink from the headlamp assembly shown in FIGS. 5 and 6.

Referring to FIGS. 5, 6, and 7, another alternate embodiment is shown generally at 80. In many respects, the headlamp assembly 80 is constructed similar to the previous embodiments. As such it generally includes a lens 82 and a housing 84 that cooperate to at least partially define an inner chamber 86 that is generally fluidly isolated from the atmosphere.

The headlamp assembly 80 includes a heat sink 88, mounted therein, having a base portion 90 positioned within the inner chamber 86, and a fin portion 92, extending outside the inner chamber 86 and being exposed to ambient air. As shown in FIGS. 5-7, the fin portions 92 of the heat sinks 88 are commonly joined together so as to generally extend across the width of the headlamp assembly 80. In the illustrated construction, the heat sinks 88 are totally supported by the lens 82, with the base portions 90 positioned within the inner chamber 86, and the fin portions 92 extending forward, through the lens 82, to a position outside the inner chamber 86.

Within the inner chamber 86, a plurality of LEDs 94 and PCBs 98 are mounted onto the base portion 90 of each heat sink 88. A reflector 96 is also provided within the chamber 86 to reflect light from the LEDs 94 forward, through the lens.

Figure 8:
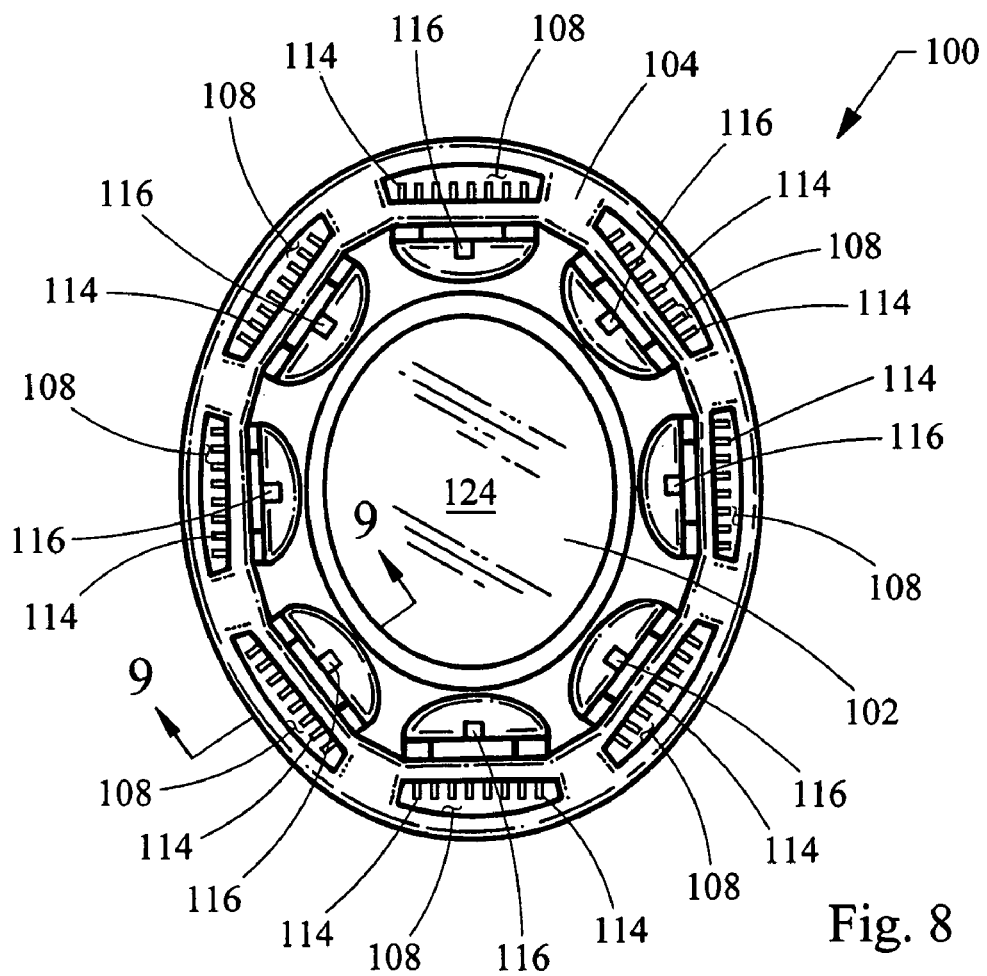
FIG. 8 is a front view of an alternative embodiment having a plurality of flow channels positioned around the inner chamber.
Figure 9:
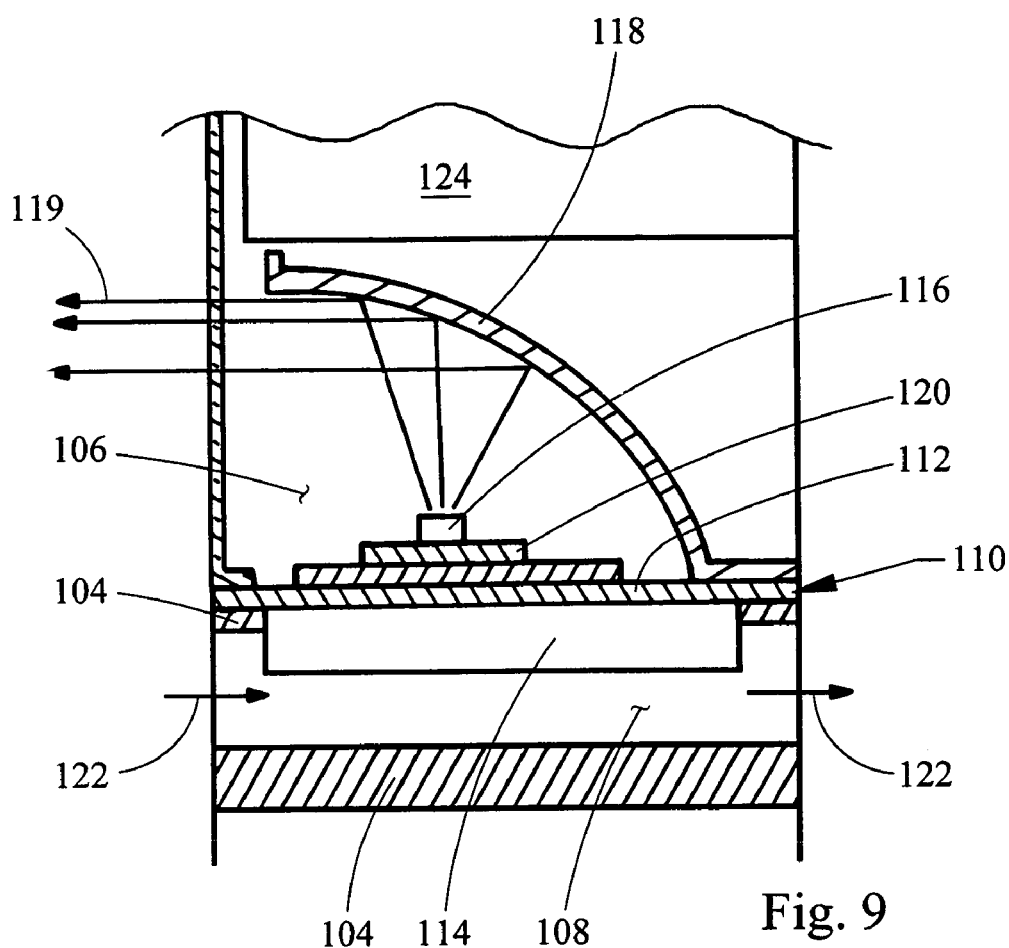
FIG. 9 is a sectional view taken generally along line 9-9 of FIG. 8.
Figure 10:
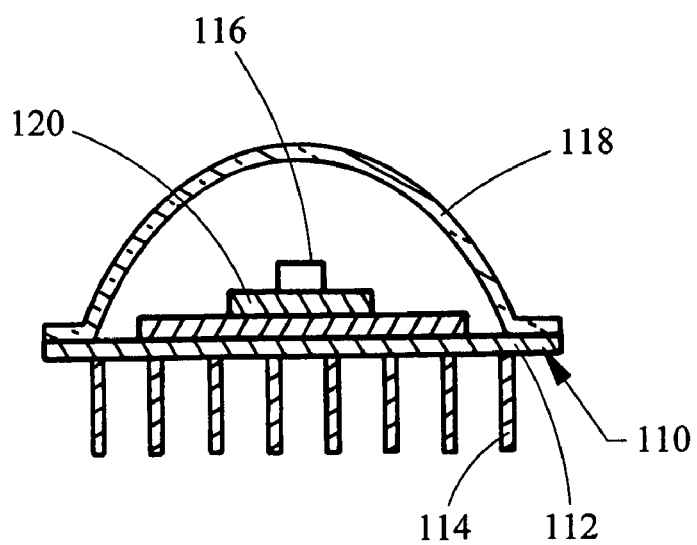
FIG. 10 is a sectional view of a LED and heat sink from the assembly shown in FIGS. 8 and 9.

Another embodiment of the headlamp assembly is shown generally at 100 in FIGS. 8-10. The headlamp assembly 100 includes a lens 102 and a housing 104 that cooperate to at least partially define an inner chamber 106 that is generally fluidly isolated from the atmosphere. Again, the housing 104 is preferably opaque, and the lens 102 is preferably formed from a transparent or translucent plastic material, such as polycarbonate.

The housing 104 includes a plurality of flow channels 108 formed therein. The flow channels 108 are spaced circumferentially around and positioned radially outward of the inner chamber 106. One heat sink 110 is mounted within the inner chamber 106, positioned radially inward of each flow channel 108. The heat sink 110 includes a base portion 112 and a fin portion 114. The base portion 112 is positioned within the inner chamber 106, and the fin portion 114 extends through the housing 104 and into the adjacent flow channel 108.

The headlamp assembly 100 includes surfaces that cooperate to focus the light rays from the light source 116 into a beam having desired characteristics and direct the light rays towards the lens 102. Referring to FIGS. 9 and 10, a reflector 118 is mounted proximal to each of the light sources 116. The reflector 118 re-directs the light rays that hit the reflector 118 to the forward direction, through the lens 102, as indicated by arrows 119.

At least one light source 116 is also positioned within the inner chamber 106. The light sources 116, are preferably LEDs. Each of the light sources 116, hereinafter just "LED 116", is attached to a PCB 120 that includes electronic controls and connections for the LEDs 116. Furthermore, each LED 116 and PCB 120 is supported on the base portion 112 of one of the heat sinks 110. The fin portions 114 of the heat sinks 110 conduct heat away from the LEDs 116. The heat sinks 110 are constructed of a material having a relatively high thermal conductivity, such as metals, metal alloys, silicon, and graphite, thereby allowing the heat to easily travel from the LEDs 116, through the base portion 112, and to the fin portion 114 of the heat sinks 110.

During operation of the headlamp assembly 100, the LEDs 116 generate heat and increase the temperature of the air, components and structures located within the inner chamber 106. Therefore, the light sources 116 are mounted onto the base portion 112 of the heat sink 110 such that heat from the light sources 116 will be conducted through the base portion 112 to the fin portion 114 of the heat sink 110, within the flow channels 108. As the vehicle moves forward, ambient air will flow through the forward facing flow channels 108 and across the fin portions 114 of the heat sinks 110, as indicated by arrows 122, and cool the fin portion 114 of the heat sinks 110, thereby dissipating the heat conducted from within the inner chamber 106.

Referring to FIGS. 8 and 9, the headlamp assembly 100 may includes an additional light source 124 positioned within the housing 104 and generally centered with respect to the LEDs 116. The additional light source may be a high intensity discharge lamp, or other suitable light source.

The housing 14, 54, 84, 104 of any of the embodiments discussed above may also be made from a thermally conductive material to further aid in the conduction and dissipation of heat from the headlamp assembly. The housing 14, 54, 84, 104 may be made from metal, metal alloy, silicon, or graphite material, and more specifically, aluminum. In another example, the housing 14, 54, 84, 104 may include a plurality of conductive components, such as a metal, a metal alloy, or a graphite material, embedded within a base material, such as a polymer. In this design, the benefits discussed above are equally applicable.

It is therefore intended that the foregoing detailed description be regarded as illustrative rather than limiting, and that it be understood that it is the following claims, including all equivalents, that are intended to define the scope of this invention.

What is claimed is:

1. A headlamp assembly for a motor vehicle comprising:
a lens;
a housing, the housing and the lens cooperating to form a housing assembly that at least partially defines an inner chamber that is generally fluidly isolated from the atmosphere;
a unitary heat sink having a base portion and a fin portion, the heat sink extending through the housing assembly with the base portion being positioned within the inner chamber and the fin portion extending beyond the inner chamber to a location exposed to ambient air;
a light source located within the chamber and being supported on the base portion of the heat sink;
a reflector positioned within the housing and adapted to reflect light from the light source; and
a flow channel positioned adjacent the housing, and having an inlet and an outlet, the fin portion of the heat sink extending into the flow channel such that heat from within the inner chamber is conducted through the heat sink to air within the flow channel, wherein the inlet of the flow channel is oriented in the forward direction and forward motion of the vehicle will cause air to be forced into the flow channel.

2. A headlamp assembly as in claim 1, wherein the inlet of the flow channel is located adjacent to a bottom portion of the headlamp assembly and the outlet is located adjacent to a top portion of the headlamp assembly.

3. A headlamp assembly as in claim 1, wherein the flow channel is positioned behind the housing and the fin portion of the heat sink extends rearward, through the housing into the flow channel.

4. A headlamp assembly as in claim 1, wherein a plurality of flow channels are spaced circumferentially around and positioned radially outward of the inner chamber, the fin portion of each heat sink extending radially outward, through the housing, into the adjacent flow channels.

5. A headlamp assembly as in claim 1, wherein the light sources are light emitting diodes.

6. A headlamp assembly as in claim 1, wherein the light source is a high intensity discharge lamp.

7. A headlamp assembly as in claim 1, wherein a plurality of light sources are mounted onto the base portion of a common heat sink.

8. A headlamp assembly as in claim 1, wherein the heat sink is made from a conductive material.

9. A headlamp assembly as in claim 1, wherein the heat sink is made from a material selected from the group: metal, metal alloy, silicon, and graphite.

10. A headlamp assembly as in claim 1, wherein the housing is made from a conductive material to further conduct heat from the inner chamber.

11. A headlamp assembly for a motor vehicle comprising:
a lens;
a housing, the housing and the lens cooperating to form a housing assembly that at least partially defines an inner chamber that is generally fluidly isolated from the atmosphere;
a unitary heat sink having a base portion and a fin portion, the heat sink extending through the housing assembly with the base portion being positioned within the inner chamber and the fin portion extending beyond the inner chamber to a location exposed to ambient air;
a light source located within the chamber and being supported on the base portion of the heat sink;
a reflector positioned within the housing and adapted to reflect light from the light source;
a flow channel positioned adjacent the housing, and having an inlet and an outlet, the fin portion of the heat sink extending into the flow channel such that heat from within the inner chamber is conducted through the heat sink to air within the flow channel; and
a fan mounted within the flow channel, the fan being adapted to draw air into and push air through the flow channel.

* * * * *